Figure 1:
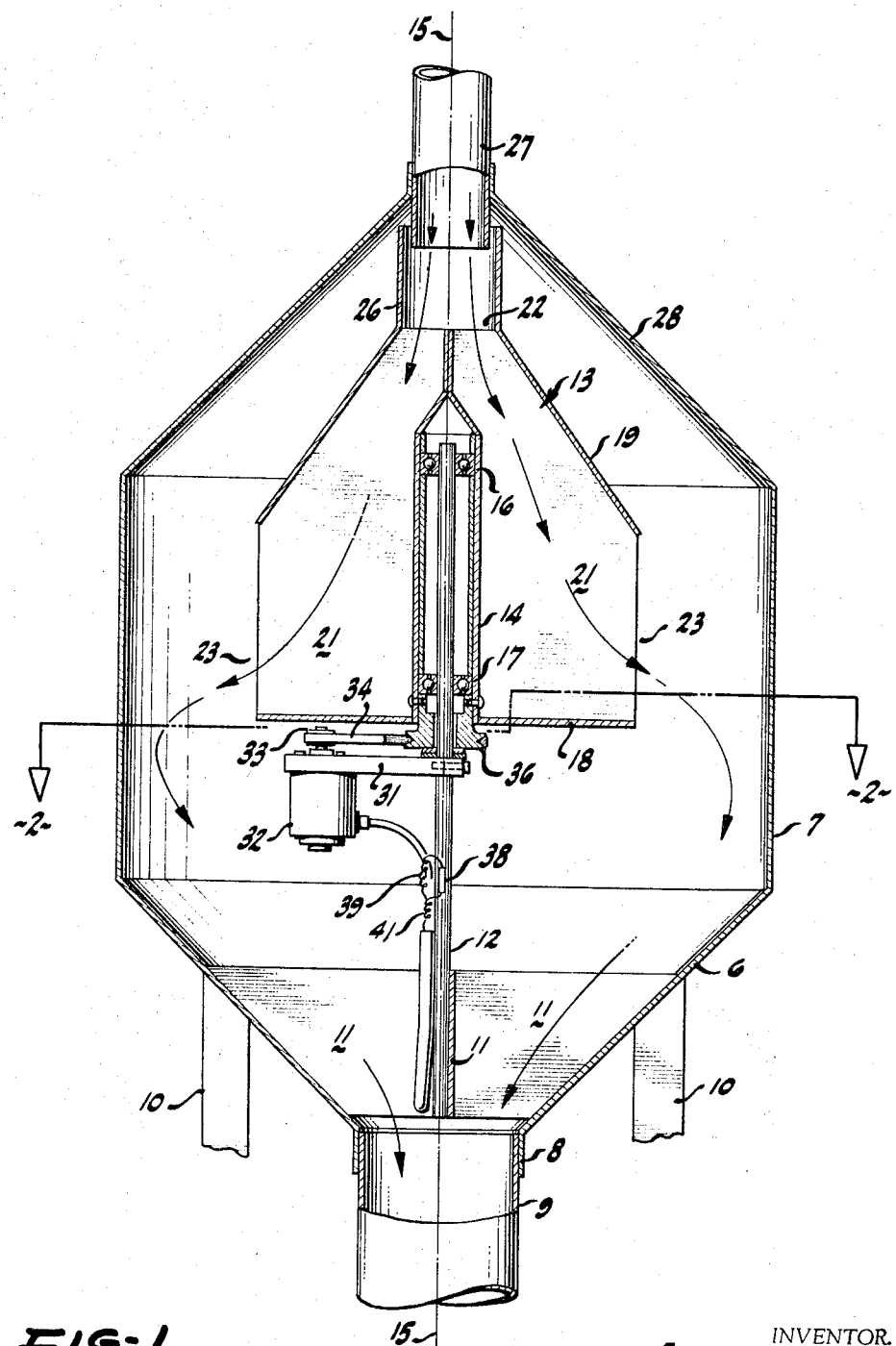

July 18, 1967     J. M. HENDERSON     3,331,244
MASS FLOWMETER FOR GRANULAR MATERIALS Filed Dec. 11, 1964     2 Sheets-Sheet 1

INVENTOR.
JERALD M. HENDERSON
BY
Lothrop & West
ATTORNEYS

July 18, 1967  J. M. HENDERSON  3,331,244
MASS FLOWMETER FOR GRANULAR MATERIALS
Filed Dec. 11, 1964  2 Sheets-Sheet 2
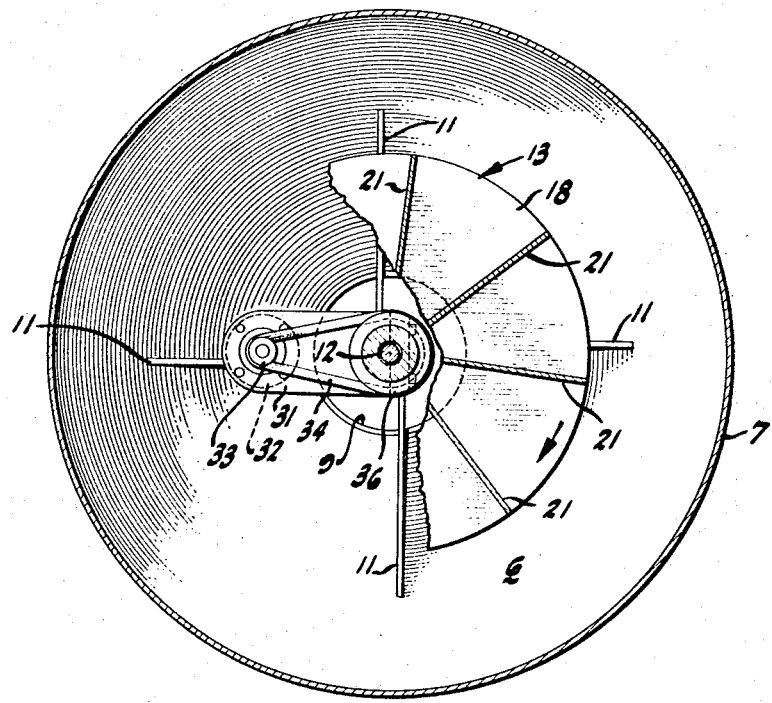
FIG·2
INVENTOR.
JERALD M. HENDERSON
BY
Lothrop & West
ATTORNEYS

United States Patent Office 3,331,244
Patented July 18, 1967

3,331,244
MASS FLOWMETER FOR GRANULAR MATERIALS
Jerald M. Henderson, Davis, Calif., assignor to The Regents of the University of California, Berkeley, Calif.
Filed Dec. 11, 1964, Ser. No. 417,642
3 Claims. (Cl. 73—194)

My invention relates to devices for measuring the amount of material of a granular nature which flows past a datum point, the measurement being in the form of the mass of material passing in a unit time.

Numerous granular materials such as sand, fine coal, food products such as rice, and the like, are measured by a batch process for a precise result. Economy and efficiency would be better if the materials could be accurately measured as they are flowing. The process could then be continuous. A difficulty has been to provide a means for measuring the flowing granular material and giving an accurate indication of the mass of material that flows past a given point in a selected interval of time.

An object of this invention is to provide a mass flowmeter for granular materials which will, while the materials are flowing, afford an accurate indication of the mass of material flowing in a given unit time.

Another object of the invention is to provide a mass flowmeter which is simple in its construction, that is not readily put out of order and which serves accurately under a wide variety of different operation conditions.

Another object of the invention is to provide a mass flowmeter the calibration of which is independent of the material handled.

Another object of the invention is to provide a mass flowmeter, particularly for granular materials, which can easily be installed in the environment in which granular materials flow and can be utilized in connection with the present material flowing equipment.

Another object of the invention is to provide a mass flowmeter, particularly for granular materials, which can operate over a protracted period without supervision of any sort and which will give a continuous indication of the material rate of flow therethrough.

Other objects together with the foregoing are attained in the embodiment of the invention described in the accompanying description and illustrated in the accompanying drawings, in which:

FIGURE 1 is a cross section for the most part on a vertical diametrical plane through one form of mass flowmeter constructed in accordance with the invention; and FIGURE 2 is a cross section, the planes of which are indicated by the lines 2—2 of FIGURE 1.

The mass flowmeter pursuant to the invention is primarily designed for operation with granular materials; for example, sand or grain, and is preferably embodied substantially as shown herein, although many variations are feasible, depending upon the nature of the material handled, the point of installation, the capacity involved, and various similar factors.

According to the invention, there is provided a base 6 in the form of a generally hollow, frusto-conical, sheet metal housing having a superposed circular cylindrical wall 7 and a subposed circular collar 8 leading to an outlet pipe 9. The housing is mounted in any suitable way; for example, by a frame 10 extending to the floor.

Within the housing lower cone 6 are radial plates 11 constituting a spider serving as a support for a central shaft 12. The shaft is fixed at its lower end to the spider plates and extends vertically upward along an axis 15 and generally symmetrically within the base housing 6. Situated around and over the free upper end of the shaft 12 is a rotor 13. The rotor includes a central tube 14 encompassing the shaft. Bearings 16 and 17 locate the rotor to revolve or rotate relative to the shaft 12 concentrically with the shaft axis 15. The rotor also includes a flat bottom plate 18 circular in plan. A conical upper rotor portion 19 is joined to the central tube 14 and to the bottom plate 18 by means of a plurality of radially extending vanes 21. The vanes are preferably planar and are arranged to extend vertically between an open upper inlet 22 of the rotor and an open, peripheral outlet 23 of the rotor. Conveniently, there is an entrance collar 26 at the upper end of the rotor. This is loosely telescoped with a vertical supply pipe 27 extending concentrically and joined by an upper cone 28 to the wall 7.

Particularly pursuant to the invention, means are provided for driving the rotor so that the rotor revolves about the axis of the shaft 12. Mounted on the shaft 12 by a clamp bracket 31 is an electric motor 32. In the present instance, the motor carries a driven pulley 33 joined by a belt 34 to a pulley 36 secured to the bottom plate 18 of the rotor. If desired, the belt 34 can be dispensed with and the motor can be concentrically mounted and directly coupled to the rotor. Appropriate electrical conductors extend to the motor 32. When the motor is energized, it always operates at a constant speed and is effective through the belt 34 correspondingly to rotate the rotor at a constant speed.

Granular material such as sand or rice, for example, is introduced to the mechanism through the pipe 27, the granular material usually falling by gravity but sometimes being mechanically accelerated. In either case the material has only an axial or vertical component of motion and is without any radial or rotary components of motion. Stated differently, the granular material falls or flows straight down into the flowmeter and does not have any vortical motion. The granular material having entered through the inlet 22 in a purely axial direction shortly is engaged by one or more of the rotating vanes revolving at a constant speed. The material is introduced close to the axis in the region of which the speed of the vanes is relatively slow. The collision between the particles and the vanes is relatively gentle and this inhibits bouncing and scattering of the material.

The engaged material is given an angular or tangential component of motion so that its angular speed is the same as that of the vanes. This angular acceleration of the particles produces an equal reaction on the rotor. There is an accompanying radial or centrifugal acceleration. The granular material continues to fall and finally is discharged from the rotor through the peripheral outlet 23 with a substantial radial component of motion and having the same tangential motion component as the vane periphery. The discharging material after it has left the rotor encounters the housing wall 7. It continues to fall by gravity through the lower cone 6 and past the spider plates 11 to discharge by gravity through the outlet pipe 9.

When the granular material is encountered by the radial vanes and is given a tangential component of motion or is angularly accelerated, the force necessary to produce such acceleration is directly proportional to the mass of the material accelerated. The force involved is produced by the constant speed motor 32, which has a corresponding torque reaction. This reaction is borne by the mounting shaft 12 and is directly proportional to the mass of material flowing through the flowmeter, it can be measured in any convenient way. Since the shaft 12 of an elastic material such as steel, it is deflected rotationally or torsionally by the torque imposed upon it by the motor 32. The deflection or twist in the supporting shaft 12 due to the acceleration of the material by the driven rotor is also proportional to the mass flow of the granular material through the flowmeter.

To measure or detect or indicate the torsional shaft deflection, a measuring device 38 is provided on the shaft 12, preferably just below the motor mounting 31. The responsive device is preferably in the form of a strain gauge fastened in place on the shaft 12 in the usual way and provided with leads 39 and 41 extending out of the housing to appropriate amplifying and indicating or recording structures of the usual kind, not shown.

In the operation of this structure, the granular material flows through the entire flowmeter by gravity. The electric motor 32 is supplied with proper amounts of electricity in order that it may always revolve at a constant speed, but no measurement is made of the electrical quantities involved. The strain gauge 38 is sensitive to and, through its attached means, records or indicates the torsion on the shaft 12 due to the mass of granular material flowing through the rotor. There is thus afforded an immediate and instantaneous indication of the mass of granular material flowing at any particular time. The output can be integrated over a known period of time to arrive at the total mass then handled. Also, without interrupting the flow of the granular material, it is possible to measure out a definite amount by allowing a known flow to continue for a measured time, for example. In this way, batch processes now utilized to afford an accurate indication of the quantity of granular material involved can be made into continuous flow processes by relying upon the accuracy of the present flowmeter.

Tests with the flowmeter as described herein, by putting quantities of material through the flowmeter as indicated, and then weighing the materials thereafter, indicate a very close coordination between measured torsional or rotational deflection of the shaft 12 and the true mass of granular material passing through the device in a known unit of time.

What is claimed is:
1. A mass flowmeter for granular material comprising a base, a vertical shaft extending upwardly from said base and at its lower end fixed rigidly thereto, a rotor having vanes, means for journalling said rotor on said shaft and for supporting said rotor on said shaft adjacent the upper end thereof, means for supplying granular material to said rotor along the axis thereof substantially without angular momentum for radial discharge therefrom, a motor, means for mounting said motor rigidly on said shaft, means connecting said motor to said rotor to rotate said rotor relative to said shaft, said motor mounting means and said connecting means transmitting to said shaft the torque resulting from the imparting by the vanes of said rotor of angular momentum to the granular materials passing through the flowmeter, and means on said shaft for measuring the torsional deflection of said shaft between said motor mounting means and the fixed end thereof resulting from the torque transmitted thereto.

2. A mass flowmeter as in claim 1 in which said motor is a constant speed motor.

3. A mass flowmeter as in claim 1, in which said measuring means is in part a strain gauge on said shaft.

References Cited
UNITED STATES PATENTS

| | | | |
|---|---|---|---|
| 2,771,772 | 11/1956 | Kirwan | 73—194 |
| 2,771,773 | 11/1956 | Wallace | 73—194 |
| 2,814,949 | 12/1957 | Bodge | 73—194 |
| 2,934,951 | 5/1960 | Li | 73—194 |
| 2,949,774 | 8/1960 | Cox | 73—194 |

RICHARD C. QUEISSER, *Primary Examiner.*

E. D. GILHOOLY, *Assistant Examiner.*